Aug. 14, 1962     F. L. AUE     3,049,014
KITCHEN UTENSIL
Filed Sept. 13, 1958

FLORENCE L. AUE

INVENTOR

BY *C. A. Snow & Co.*

ATTORNEYS.

3,049,014
KITCHEN UTENSIL
Florence L. Aue, 6071 Martin Road, Muskegon, Mich.
Filed Sept. 18, 1958, Ser. No. 761,853
1 Claim. (Cl. 73—426)

This invention relates to a kitchen utensil in the form of a scoop, designed primarily for measuring shortening such as lard, or shortening having the consistency of lard, the utensil being adapted for storing in the receptacle in which the shortening material is contained, when not in use.

An important object of the invention is to provide a measuring utensil in the form of a scoop which is so shaped that the utensil will accurately measure one cupful of shortening or fraction thereof, as desired.

Another object of the invention is to provide graduations on the inner and outer surfaces of the bowl of the utensil where the graduations will be clearly visible, permitting the shortening material to be accurately measured.

Still another object of the invention is the provision of notches formed in the upper edge of the bowl which notches align with the graduations appearing on the outer and inner surfaces of the bowl to facilitate the use of the utensil as a measuring scoop.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing.

Figure 1:
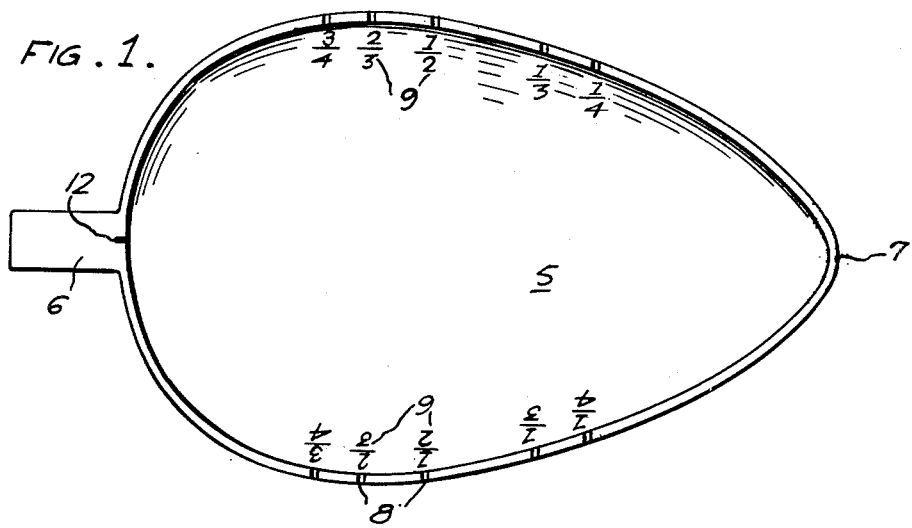
FIGURE 1 is a plan view of a measuring utensil constructed in accordance with the invention.

Referring to the drawing in detail, the body of the utensil is indicated generally by the reference character 5, the body 5 being in the form of a bowl wide at its end adjacent to the handle 6, the walls of the body tapering to a pointed end 7 to permit the utensil to be forced into a container of shortening, to scoop a desired quantity of shortening therefrom.

Figure 2:
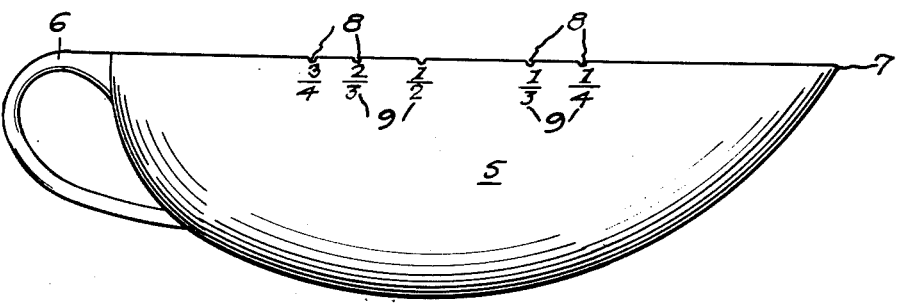
FIG. 2 is a side elevational view thereof.

As better shown by FIG. 2 of the drawing, the shape of the body 5 is such that the body or bowl is exceptionally deep throughout substantially the entire length of the body and tapers sharply towards the pointed end 7, providing a structure which when level full has a capacity equal to one measuring cup.

The upper edge of the body or bowl of the utensil is provided with notches 8 that are arranged at opposite sides of the bowl dividing the bowl into sections of various sizes so that a knife or similar bladed implement may be used in measuring and removing a desired portion, or fraction of the leveled contents of the bowl to meet the requirements in cooking.

Arranged on the outer and inner surfaces of the bowl of the scoop, are markings 9 that align with the notches 8 in indicating quantities of material contained in the bowl between the tip or pointed end 7 of the bowl and a transverse imaginary line drawn between the notches and markings at opposite sides of the bowl and which are clearly visible to the person using the utensil.

As shown, the handle which is indicated by the reference character 6, is curved in such a way that a person gripping the handle in forcing the scoop into the shortening material will have sufficient leverage to cause the scoop to enter the material in scooping a quantity of material from the receptacle in which the material is contained.

The upper surface of the handle 6 is preferably wide and flat and is provided with a mark 12 disposed in a line with the longitudinal axis of the scoop indicating the half-way point of the scoop so that when a scraper is inserted into the shortening on an imaginary line with the longitudinal axis of the scoop, one-half of any previously measured amount may be contained in the scoop, as for example by dividing a quantity measuring one-quarter, in half along the longitudinal axis of the bowl, using the marking 12 as a guide, one-eighth of a cup of shortening may be accurately measured by the use of the scoop.

Thus it will be seen that due to the construction shown and described, I have provided a measuring scoop which is constructed in such a way that desired quantities of shortening such as lard or the like may be readily removed from a container of shortening and accurately measured to insure the designated quantity of shortening being supplied during the mixing of ingredients in cooking.

Having thus described the invention, what is claimed is:

A measuring scoop having a handle, adapted for dipping into solid shortening, having an exact predetermined capacity when full and levelled off, comprising a bowl which is basically oval in shape throughout the entire length, said bowl having a bottom rounded throughout its entire length and width, and being wider at the rear end and tapered to a modified point at the tip end, lines of spaced notches formed in the marginal side edges only of said bowl at opposite sides of said bowl, said bowl having identifying indicia on the outer surface thereof opposite to said notches, the spaces between the indicia being graduated from the tip of the bowl towards the handle thereof, the notches at one side edge of the bowl aligning with corresponding notches in the other side edge of the bowl directly opposite thereto, said notches and indicia at opposite sides of said bowl indicating the locations of imaginary transverse lines along which divisions of the contents of the scoop can be made to obtain desired accurate fractions of one cupfull, and said handle having a wide flat upper surface flush with the marginal edge of said scoop, forming a continuation of said marginal edge of said scoop, a division indicating character on said upper surface of said handle intermediate the side edges of the handle and in line with the longitudinal axis of said bowl, indicating a measurement with the tip end of the bowl.

References Cited in the file of this patent

UNITED STATES PATENTS

| | | |
|---|---|---|
| 597,188 | Nance | Jan. 11, 1898 |
| 1,228,373 | Kristofek | May 29, 1917 |
| 1,250,890 | Johnson | Dec. 18, 1917 |
| 2,645,127 | Parks | July 14, 1953 |
| 2,770,135 | Parvin | Nov. 13, 1956 |